T. MORGAN.
MACHINE FOR MAKING POPCORN.
APPLICATION FILED FEB. 9, 1917.

1,339,662.

Patented May 11, 1920.
2 SHEETS—SHEET 1.

Inventor
Thomas Morgan
By Geo. W. Kennedy Jr.
Attorney.

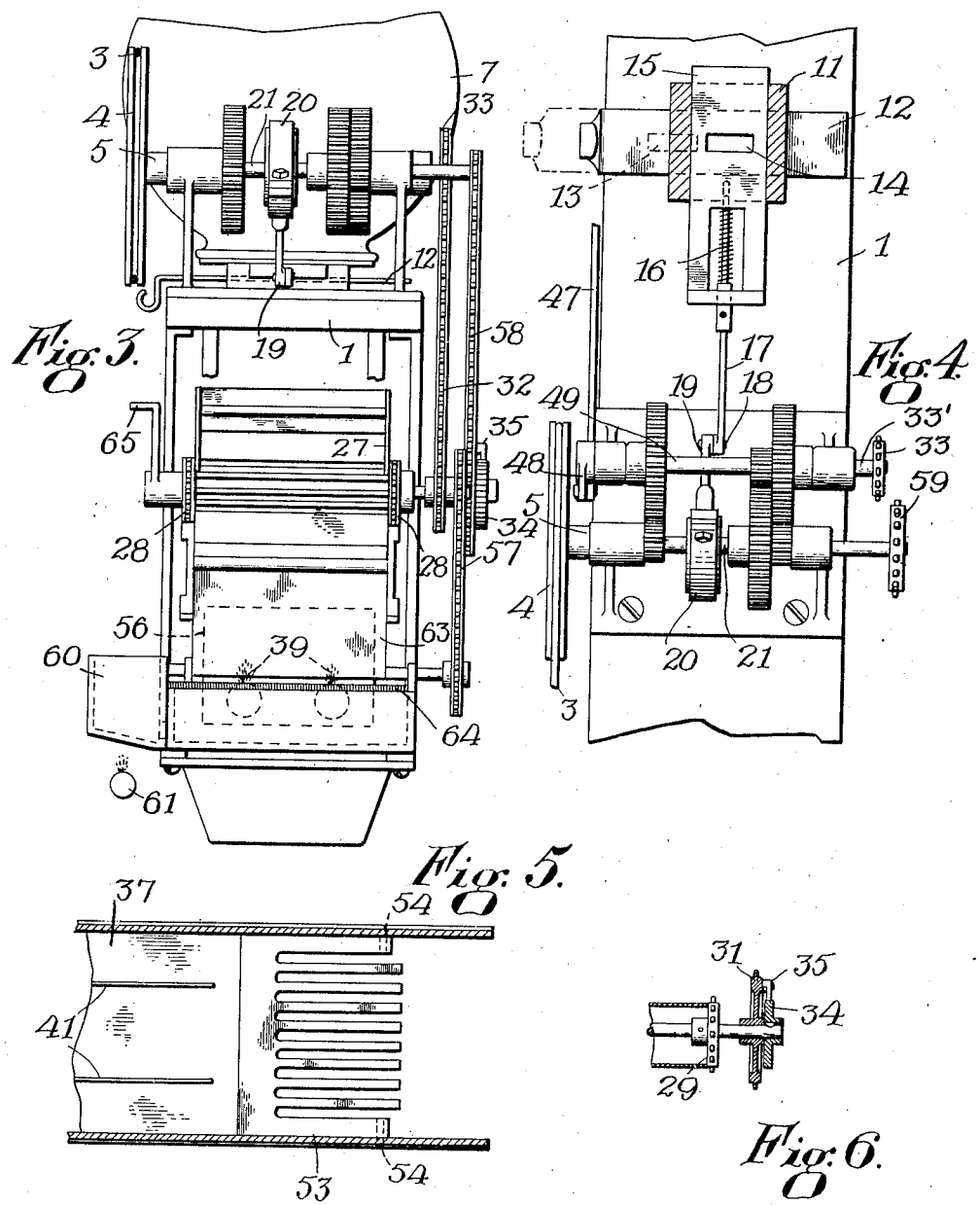

UNITED STATES PATENT OFFICE.

THOMAS MORGAN, OF WORCESTER, MASSACHUSETTS.

MACHINE FOR MAKING POPCORN.

1,339,662.  Specification of Letters Patent.  Patented May 11, 1920.

Application filed February 9, 1917. Serial No. 147,683.

*To all whom it may concern:*

Be it known that I, THOMAS MORGAN, a citizen of the United States, residing at Worcester, in the county of Worcester and Commonwealth of Massachusetts, have invented a new and useful Improvement in Machines for Making Popcorn, of which the following, together with the accompanying drawings, is a specification.

The present invention relates to machines for making popcorn, and has particular reference to automatic mechanism of this character adapted, in operation, to deliver a uniform product in the form of perfectly popped and well-buttered corn, the same having been introduced into the machine as unpopped grains. The invention resides in the provision of instrumentalities which feed successive measured charges of unpopped grains to a popping apparatus, and instrumentalities which control the popping operation in such a manner that all unpopped or defective grains are separated and cast aside before the final product is buttered. The invention further resides in the provision of means adapted to act uniformly on each successive charge to effect the most efficient and thorough heating and popping of grains, without danger of burning or scorching the product, and with the minimum waste due to the passage of any unpopped grains. The invention further resides in the provision of efficient buttering devices, acting only on the perfect product emerging from the popping apparatus, to apply a sufficient amount of melted butter to each piece, means being provided to prevent waste of butter, and the application of an excess amount thereof to any piece. The foregoing objects, as well as various other objects hereinafter set forth, are attained by the mechanism disclosed in the following description, reference being had in connection therewith to the accompanying drawings, in which—

Fig. 3 is an end view of the machine, as seen from the right hand end of Fig. 1.

Fig. 4 is a top plan view of the operating parts, the magazine for the unpopped grains being removed to disclose details of the feeding mechanism.

Fig. 5 is a fragmentary view showing the top side of the popping apparatus in its relation to the device employed for separating defective and unpopped grains from the finished product, before the latter is buttered.

Fig. 6 is a fragmentary sectional view illustrating a detail of my operating mechanism.

Like reference characters refer to like parts in the different figures.

Figure 1:
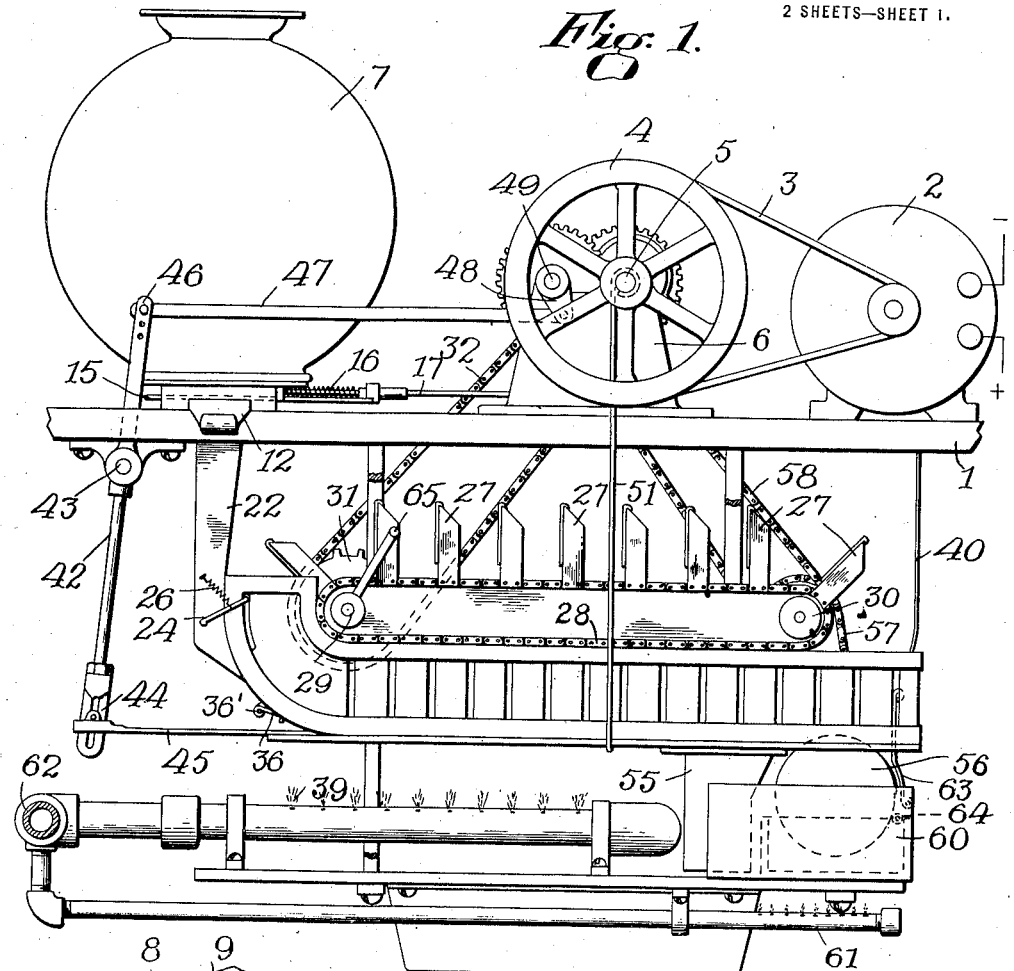
Figure 1 is a side view of the mechanism embodying my invention.

The machine illustrated in the drawings is preferably inclosed and supported by a suitable casing, but for convenience of illustration only an upper member 1 of said casing is herein shown, the latter being used, if desired, to support, on the outside thereof, a driving motor 2 which is operatively connected by a belt 3 with a driving pulley 4 on the main actuating shaft 5 of the machine. The latter is preferably journaled in a suitable framework 6, which is employed to support the gearing and countershafting used to actuate, at the various speeds required, the several moving parts of the machine, namely the feeding mechanism, the popping mechanism, the mechanism for conveying the material through the popping mechanism, and the buttering mechanism, all as hereinafter described. The details of said gearing and countershafting for transmitting the power of the main shaft 5 to these various mechanisms form no part of the present invention, the same being obvious mechanical expedients used to operate such mechanisms at the speeds required by each, for proper coördination with the other moving parts.

The feeding mechanism is employed in connection with a magazine or container 7 for a supply of unpopped kernels or grains, the same, for convenience, being disposed outside of the inclosing casing, but preferably supported on the member 1 thereof. The magazine 7 has a bottom 8, which supports the grain supply therein, said bottom being apertured at 9 in alinement with a passage 10 through member 1 and interposed block 11. The block 11 affords a guideway for a sliding gate 12, having an aperture 13 therein; when the gate 12 is drawn by the operator into the dotted line position of Fig. 4, the aperture 13 is moved out of alinement with passage 10 and aperture 9, the solid portion of the gate thus shutting off communication between said passage 10 and the interior of magazine 7. When the gate 12 is moved to the right in Fig. 4, the aperture 13 lines up in whole or in part with aperture 9 and passage 10, and assumes a position to be registered intermittently, more or less fully, with an aperture 14 in a reciprocating slide 15 which is suitably guided in the block 11.

The slide 15 is connected, preferably through a yieldable spring 16, with a rod 17, whose other end is pivoted at 18 to an oscillating pitman 19 carried by an eccentric 20 on a slow speed shaft 21, driven through suitable gearing from alined main shaft 5 and countershaft 49, hereinafter referred to. It will be understood that the rotation of shaft 21, in the operation of the machine, effects, through rod 17 and yielding spring connection 16, the reciprocation of slide 15, to carry the aperture 14 of the latter into and out of registration with the corresponding aperture 13 of gate 12, when the latter is in position to be overlapped by any part of aperture 14.

This intermittent registration, at appropriate speed with relation to the functions of the other parts of the machine, permits each time the passage of a predetermined quantity of grains from magazine 7 through the registering apertures into passage 10, whence said grains pass by gravity to the bottom of a chute 22 which is normally closed by a swinging valve 23. When it is desired to render the feeding and measuring mechanism inoperative, as when the machine is stopped or at any other time, the gate 12 is retracted to its dotted line position, Fig. 4, and thus all communication between magazine 7 and chute 22 is closed, irrespective of the position of slide 15. The relative movement between slide 15 and its operating rod 17 is allowed by the yielding spring connection 16, thus preventing breaking or jamming of the parts when, for instance, a grain or grains become wedged between the opposite edges of apertures 13 and 14 in the operation of the feed.

Figure 2:
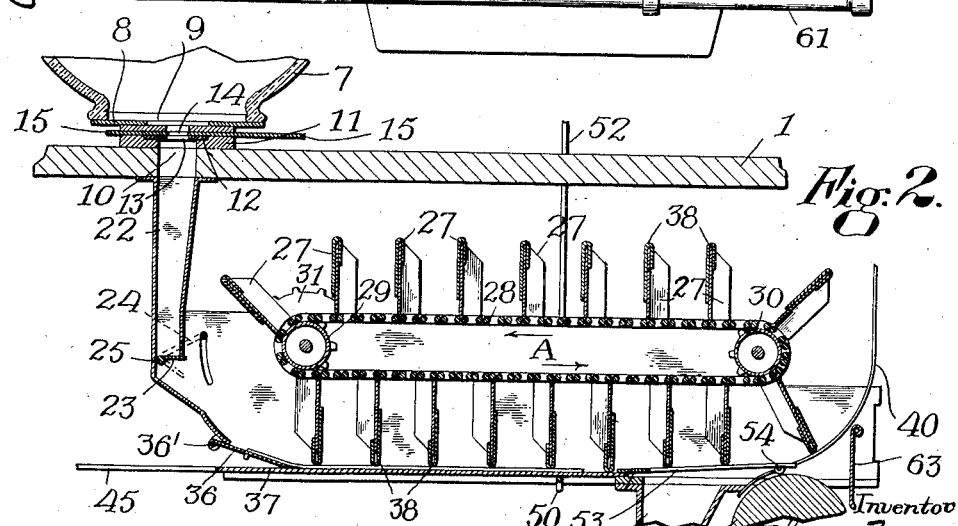
Fig. 2 is a longitudinal sectional view of the machine, illustrating the operation of the moving parts thereof.

The measured and predetermined quantities of material which pass into chute 22 at each intermittent operation of the feeding mechanism are all retained within said chute by valve 23 until said valve is caused to open, by the downward movement of a projecting arm 24, which is attached to the pivotal axis 25 of said valve in any suitable manner, and is subject to the action of a spring 26 to normally retain said valve in closed position. The free end of arm 24 is thus held in the path of movement of a plurality of spaced partitions 27, which are carried upon and project at right angles to a pair of endless chains 28 passing around a pair of sprocket cylinders 29 and 30, which extend transversely substantially the full width of the machine. The shaft of sprocket cylinder 29 carries at one end a driving sprocket 31, which is connected by a sprocket chain 32 to a sprocket wheel 33 on slowest-speed shaft 33', alined with countershaft 49, hereinbefore referred to. The sprocket wheel 31 is loosely journaled on the shaft of sprocket cylinder 29, as shown in Fig. 6, said shaft having keyed or otherwise secured thereto, adjacent the sprocket wheel 31, a ratchet wheel 34, the teeth of which are engaged by a pawl 35 pivoted on the face of sprocket wheel 31. The rotation of sprocket wheel 31, in a counter-clockwise direction, Fig. 1, is thus transmitted to the sprocket cylinder 29 through the pawl and ratchet drive 34, 35, whereby the chains 28 are caused to travel at the proper speed in the direction of the arrows A, Fig. 2, the partitions 27 moving therewith and successively depressing the arm 24 to open the valve 23 at the bottom of feed chute 22. The pawl and ratchet drive for the chains 28 is provided for a purpose which will be hereinafter set forth. The speeds of the chain moving mechanism and the feeding mechanism are so related that each depression of the arm 24 by one of the partitions 27 opens the valve 23 to allow the descent, by gravity, of a single measured charge of grain from the chute 22, such a measured charge having previously been segregated in the chute by the operation of the feeding mechanism a given number of times.

Each charge so released falls by gravity upon an inclined member 36, pivoted at 36', with its free end resting by gravity on a plate 37. The charge of material is thus confined between the partition 27, which releases it from the chute 22, and the partition immediately in front of said releasing partition, so that in the operation of the machine, each space between the partitions 27 in the lower half of the endless conveyer mechanism has inclosed therein a single measured charge of grains. Each such charge as it is received between said partitions is pushed, by the movement of the rear partition of said inclosing space, lengthwise of said plate 37, which is supported with its surface in contact with the free ends of the partitions making up the lower half of the conveyer mechanism. Said charges are pushed gradually over the surface of said plate, by the movement of said partitions, each of the latter preferably having, beyond its rigid portion, a slidable extension 38, which is movable of itself, by gravity, to increase or diminish the effective length of the partition when the latter is traveling in contact with the plate 37. That is, each partition will adjust itself by means of its extension 38 to make sliding contact at its free end with the plate 37, thus compensating for any unequal expansion or deformation of the parts caused by the application of heat to the plate 37, whose under surface is exposed to the action of a series of burners 39, as hereinafter more fully set forth. The extensions 38, at the end of the travel of partitions 27 in the lower half of the conveyer mechanism, are engaged by curved wires 40, which serve to prevent their further outward movement until each partition has rounded the sprocket cylinder 30, when said extensions will obviously be retained by gravity in their innermost positions during the passage of the partitions through the upper half of the conveyer mechanism. As shown in Fig. 5, longitudinal wires 41 of small diameter, with which the extensions 38 make contact, are superposed on plate 37, thus reducing the friction to be overcome in moving the conveying mechanism; these wires 41 are carried by the member 36, and are held stationary notwithstanding the reciprocation of plate 37. Obviously, these wires are so small that the spaces between the plate 37 and the edges of said extensions 38 are not wide enough to allow any grains to pass under said partitions.

The heated plate 37 is reciprocated by means of an oscillating arm 42, pivoted at 43 and having a pin and slot connection 44 with an extension 45, which is rigidly attached to said plate. The other end of arm 42 is pivotally connected at 46 to a connecting rod 47 which is operated by a crank 48 on a countershaft 49, the latter being geared to the main shaft 5, as shown in Fig. 4. The fairly rapid reciprocation of plate 37, which supports the charges of corn to be popped thereon, is sufficient to prevent the burning or scorching of the grains as they are gradually moved over the heated surface of said plate by the conveying mechanism, such reciprocation serving to agitate and spread the grains, and preventing their accumulation at any one point in the spaces between partitions 27, the effect being to spread each charge evenly over that portion of the surface of the popping plate which it occupies at any given instant in the operation of the machine. Any suitable means may be employed to support and guide said popping plate 37 in its reciprocation, as, for instance, a swinging yoke 50 attached thereto at the end remote from extension 45, the arms 51 and 52 of said yoke being suspended from the fixed framework.

The traverse of each charge over the surface of the popping plate is so timed that the continuous application of heat from burners 39 will effect the perfect popping of all the corn therein, it being understood that each successive charge has an exposure of the same duration to the popping mechanism, as above described. Provision is made, however, for the elimination of defective grains, or grains which for some reason are not perfectly popped on the popping plate 37, by the movement of the product of the popping operation across a grating 53 immediately after it leaves the popping plate. The grating 53 is preferably pivoted as at 54, so that its free end rests by gravity on the surface of reciprocating popping plate 37, the latter moving back and forth beneath the free end of said grating. The interstices of said grating, as shown in Fig. 5, are of limited width, so as to prevent the passage therethrough of any perfectly popped piece, but all unpopped or imperfectly popped pieces will pass through said interstices into a receptacle 55 disposed immediately below said grating.

The perfectly popped pieces carried across said grating by the movement of the partitions 27, pass onto the adjacent upper surface of a revolving roll 56, the shaft of which is connected by any suitable driving means, such as the sprocket drives 57, 58 and 59, with the reduced speed shaft 21 driven by gearing from the main shaft 5. The lower half of roll 56 is immersed in a vat 60 containing a quantity of melted butter, the same being maintained in a liquid state by the heat from a series of burners 61. The latter, as well as the popping plate burners 39, are preferably gas burners, fed from a common gas supply 62. The surface of roll 56, on which the perfectly popped pieces are received, is thus kept coated with melted butter, which is transferred to said pieces of popped corn as they are held in contact with said roll by a pivoted member 63. The popped corn thus buttered slides by gravity over the exposed surface of roll 56 and is received in a suitable receptacle, not shown, or it may drop to the bottom of the inclosing casing, after leaving the edge of vat 60. To prevent the jamming of any pieces between the edge of vat 60 and the adjacent rotating surface of roll 56, I prefer to provide a spiral spring 64 running lengthwise of said roll at this point, said spring serving to deflect the pieces of popped corn as they approach the edge of vat 60, and operating to collect and drain back into the vat any excess molten butter on the surface of said roll.

The operation of the machine is clear from the foregoing detailed description of its parts, the mechanism receiving successive measured charges of unpopped corn at one end, subjecting each charge uniformly to the action of heat for the required time to cause popping, and discharging perfectly popped and buttered pieces at its other end, after eliminating all imperfect and unpopped grains. For the purpose of cleaning out the conveying mechanism, when the machine is stopped after a period of operation, or even during its operation, the shaft of sprocket cylinder 29 is provided with a hand crank 65, which permits the operator to move the chain 28 at a rapid rate, in advance of the movement imparted thereto by the driving sprocket 31 and sprocket chain 32. This movement is permitted by the pawl and ratchet connection 34, 35, hereinbefore referred to. It will be understood that during said cleaning out of the conveying mechanism and popping plate, the gate 12 is in the dotted line position of Fig. 4, thus preventing the descent of any unpopped grains into the chute 22, so that the opening of valve 23 is without effect.

The reciprocating popping plate 37 is supported only by its actuating arm 42, and by the swinging arms 51 and 52 of yoke 50, so that there is no possibility of said plate tending to stick or bind through expansion or distortion of parts by heat, as would be the case if it were supported in fixed longitudinal slideways or guides. The members employed for the conveying of the corn onto and off of said plate, namely the member 36 and the grate 53, are therefore especially adapted to permit free movement, up and down as well as longitudinal, of said popping plate, said members, as previously pointed out, being pivoted, with their free ends resting by gravity on the surface of said plate. The partitions 27, as well as said members 36 and 53, are capable of adjusting themselves to any position which the popping plate, in its reciprocation, may assume, and it will thus be seen that the operation of the mechanism is in no way affected by warping or expansion of the parts.

I claim,

1. In a machine of the class described, a reciprocating popping plate for the support of the grain, and a member for the support of the grain in its passage to said popping plate, said member being pivoted, with its free end resting at all times on said popping plate, whereby to continuously support said grain in its passage, and at the same time permit the reciprocation of said popping plate.

2. In a machine of the class described, a popping plate, means for successively segregating measured charges of grain to be fed to said popping plate, means for moving said charges, successively, over said popping plate, and a charge releasing device operated by said last named means.

3. In a machine of the class described, a reciprocating popping plate on which the grains are popped, and a member for supporting the popped grains in their passage off of said popping plate, said member being pivoted, with its free end resting at all times on said popping plate.

4. In a machine of the class described, a reciprocating popping plate for the popping of the grains, and members associated therewith for the support of the grain in its passage onto and off of said popping plate, said members being pivoted with their free ends resting at all times on said popping plate.

5. In a machine of the class described, a plate for supporting the grains, means for reciprocating said plate, and means traversing the surface of said plate for advancing the grain thereon, said means adjusting itself by gravity to remain in contact with said surface during its traverse thereof.

6. In a machine of the class described, a plate for supporting the grains, means for reciprocating said plate, and means traversing the surface of said plate for advancing the grain thereon, said means being extensible by gravity to maintain itself in contact with said surface.

7. In a machine of the class described, a reciprocating plate for supporting the grains, and means traversing the surface of said plate for advancing the grain thereon, means for segregating a measured charge of grains, and means actuated by the movement of said traversing means for releasing said charge to be advanced thereby on said reciprocating plate.

8. In a machine of the class described, a reciprocating plate for supporting the grains, a plurality of members adapted to traverse the surface of said plate to advance the grains thereon, and means operated successively by said traversing members to release measured charges of grain to be advanced by each over said reciprocating plate.

9. In a machine of the class described, a reciprocating plate for supporting the grains, a plurality of members adapted to traverse the surface of said plate to advance the grains thereon, means for successively segregating measured charges of grain, and means operated succesively by each of said traversing members to effect the release of such a charge to be advanced thereby over said reciprocating plate.

10. In a machine of the class described, a reciprocating plate for the support of the grains, means adapted to traverse the surface of said plate to advance the grains thereon, and means interposed between the surface of said plate and said traversing means for reducing the friction between parts.

11. In a machine of the class described, a reciprocating plate for the support of the grains, means adapted to traverse the surface of said plate to advance the grains thereon, and means interposed between said surface and said traversing means for reducing the friction between parts, said interposed means being stationary.

12. In a machine of the class described, a reciprocating plate for the support of the grains, means adapted to traverse the surface of said plate to advance the grains thereon, a pivoted member, having its free end resting by gravity on said surface, for supporting the grains in their passage to said surface, and means carried by said pivoted member for reducing the frictional contact area betwen said surface and said traversing means.

13. In a machine of the class described, a reciprocating heating surface for supporting the grains to be popped, means for applying butter to the popped material, and a pivoted member with its free end resting by gravity on said heating surface, for supporting the popped material in its passage from said surface to the butter applying means.

14. In a machine of the class described, a reciprocating heating surface for supporting the grains to be popped, means for applying butter to the popped material, and a pivoted member with its free end resting by gravity on said heating surface, for supporting the popped material in its passage from said surface to the butter applying means, said member being perforated, whereby to prevent the passage of unpopped and defective pieces to said butter applying means.

THOMAS MORGAN.

Witnesses:
 PENELOPE COMBERBACH,
 NELLIE WHALEN.